United States Patent

[11] 3,550,776

| [72] | Inventor | William I. Hamilton |
| | | Chicago Heights, Ill. |
| [21] | Appl. No. | 781,750 |
| [22] | Filed | Dec. 6, 1968 |
| [45] | Patented | Dec. 29, 1970 |
| [73] | Assignee | Allis-Chalmers Manufacturing Company |
| | | Milwaukee, Wis. |

[54] FUEL LINE PURIFIER
9 Claims, 2 Drawing Figs.
[52] U.S. Cl. .................................................... 210/94,
210/312, 210/416
[51] Int. Cl. .................................................... B01d 35/02
[50] Field of Search .......................................... 210/94,
312, 313, 416

[56] References Cited
UNITED STATES PATENTS

| 2,230,408 | 2/1941 | Lackey | 210/313 |
| 2,241,005 | 5/1941 | Smith | 210/94 |
| 2,367,935 | 1/1965 | Franck | 210/312X |
| 2,697,523 | 12/1954 | Bloksma | 210/312X |
| 3,278,032 | 10/1966 | Smith | 210/416X |
| 3,322,280 | 5/1967 | Taylor | 210/313X |

*Primary Examiner*—John Adee
*Attorneys*—Arthur L. Nelson, Charles L. Schwab and Robert B. Benson ABSTRACT: A fuel line filter and sediment trap for internal combustion engine. The filter is positioned above the bottom of the container and a conduit leads to the trap which is positioned below the filter.

PATENTED DEC 29 1970

3,550,776

Inventor
William J. Hamilton
By
Arthur D. Nelson
Attorney

FUEL LINE PURIFIER

This invention relates to an internal combustion engine and more particularly to a fuel line filter and sediment trap for purifying the fuel lines on the engine.

A problem constantly present with operation of internal combustion engines is the filtration or purifying the fuel supply to the engine. This problem is of even more concern in supplying fuel to diesel engines. Small impurities in the fuel line may cause accelerated injection system wear which in turn will cause erratic operation of the engine and low performance. Fuel filters and also sediment bowls have been used in the filter lines to remove impurities. Drain plugs have also provided a means of removing impurities from the fuel line such as dirt and water which will seek the lowest level in the fuel line at which point it can be removed. These filters and drain plugs have not proved entirely satisfactory as the movement of the fluid through the line will cause some of the impurities to be carried through the line due to the force of the flow of the fuel. Accordingly, this invention will provide the means of trapping foreign material in the fuel line and provide a visual indicator of such impurities which can be removed from the line. The fuel filter is constructed in combination with the sediment bowl to provide a chamber of substantial volume creating a static condition of the fuel before it flows through the filter. At this point a sediment bowl is placed at the low point in the chamber to receive water and impurities which will settle into the bowl. The fuel will be filtered through the filter and passed on to the fuel feeding means for the engine. The arrangement of the filter and sediment bowl will provide a convenient means of removing impurities and supply a substantially cleaner and purer fuel to the internal combustion engine.

It is an object of this invention to provide a filter and a sediment bowl for removing of impurities in the fuel line.

It is another object of this invention to provide a filter defining a static condition in a fuel chamber at which point a sediment bowl is mounted for trapping impurities before the fuel is filtered through the filter and supplied to a fuel feeding device to the engine.

It is a further object of this invention to provide a filter defining a static fuel chamber and a sediment bowl communicating with the chamber for receiving foreign material and a filter removing other foreign material before the fuel is supplied to the fuel feeding means of the engine.

The objects of the invention are accomplished by the use of a filter defining a large chamber in which the fuel from the fuel tank is received. This chamber defines a sufficiently large volume to create a relatively static condition of the fuel. A sediment bowl is positioned at a low point on the chamber to receive foreign material and is transparent to operate as a visual indicator to the operator for removal of water and such other foreign materials. The filter filters the fuel passing through the fuel line to the fuel feeding device for the engine. The filter is of sufficient size to provide adequate flow without disturbing the static condition in the chamber. The fuel is thereby purified before it is supplied to the engine.

The preferred embodiments of this invention will be described in subsequent paragraphs and illustrated in the attached drawings.

Figure 1:
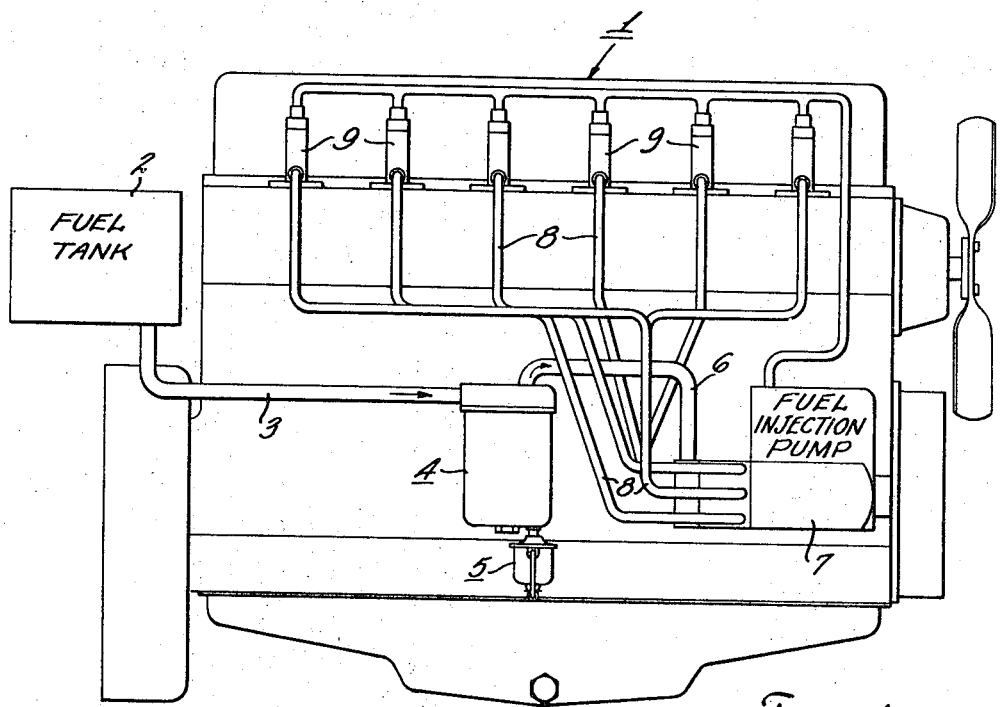
FIG. 1 illustrates the combination filter and sediment bowls in a fuel line for an internal combination engine.

Referring to the drawings the engine 1 illustrated is a diesel engine having a fuel tank 2 and a fuel supply conduit 3. The conduit 3 feeds to the filter 4 which carries a sediment bowl 5. The outlet side of the filter is connected to the conduit 6 which feeds into the fuel injection pump 7. A plurality of fuel injection supply lines 8 feed into mating injector nozzles 9. The fuel injection pump 7 includes a fuel transfer pump to draw fuel from the fuel tank 2 and supply fuel for injection. The fuel supplied from the fuel tank 2 must flow through the filter 4 and by the sediment bowl 5 in order to pass from conduit 3 to conduit 6 in the fuel supply line.

Figure 2:
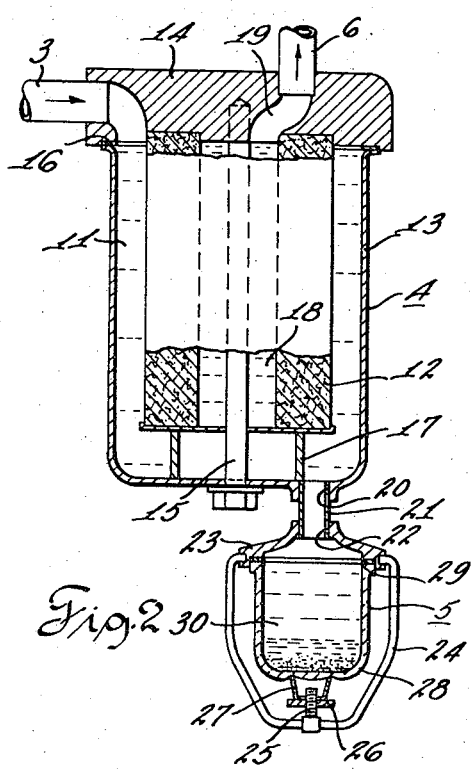
FIG. 2 is a cross section view showing the combination fuel filter and sediment bowl.

Referring to FIG. 2 the inlet conduit 3 flows into the chamber 11 about the outer periphery of the filter element 12. The chamber 11 is defined by the filter element 12 and the housing 13 which is fastened to the casting 14 by the bolt 15. A suitable seal 16 seals the assembly.

The housing 13 supports the base 17 which carries the filter element 12. The upper portion of the filter element seats firmly against the lower side of the casting 14 to seal the chamber 11 from the filtered chamber 18 within the inner periphery of the filter element 12. The chamber 18 is in communication with the passage 19 which is connected to the outlet passage 6 feeding into the fuel injection pump.

The lower portion of housing 13 is provided with a threaded opening 20 which threadedly receives a pipe 21 which in turn is threaded to the inner periphery of the threaded opening 22. The cap 23 is connected to the pipe 21 and carries a bail 24. The bail 24 is resiliently carrying the bolt 25 which threadedly receives the knurled nut 26. The hat-shaped retainer 27 is positioned between the knurled nut 26 and the sediment bowl 28. The sediment bowl 28 is constructed of a transparent material such as glass to provide an indication of impurities settled into the bowl. A suitable seal 29 seals the chamber 30 from the atmosphere.

The preferred embodiment of this invention has been illustrated and described and its operation will be described in the following paragraphs.

The fuel transfer pump in the fuel injection pump will draw fuel from the fuel tank 2 when the engine is in operation. The fuel supply from the tank 2 flows through the inlet conduit 3 into the large chamber 11 defined by the outer periphery of the filter 12 and the inner periphery of the housing 13. This chamber is of substantial volume and thereby creates a relatively static condition of the fuel in the chamber. The static condition will allow foreign material such as dirt and water to settle to the bottom of the chamber. It is noted that the bottom portion of the chamber is formed with a metallic base which does not filter and this portion of the chamber 11 contains stagnant fuel and any impurities are allowed to settle into the sediment bowl 28. The suction from the transfer pump causes the fuel to be drawn through the filter element 12. The fuel then passes through the chamber 18 on the inner periphery of the fuel element 12 and out of the passage 19. The fuel then passes through the outlet conduit 6 to the fuel pump and is supplied to the fuel injectors through the fuel injection pump. The fuel arriving to the fuel injection pump is purified and the danger of impurities causing defective performance of the engine due to the impurities is eliminated. The sediment bowl 28 is transparent which provides the operator a visual indication of sediment present in the bowl. The bowl 28 may be readily removed by screwing the knurled nut 26 downwardly on the bolt 25 releasing the pressure on the underside of the hat-shaped retainer 27 which bears against the lower portion of the sediment bowl 28. The bowl can then be removed and the fuel and the impurities in the bowl are thrown away. The bowl is then replaced in the manner as shown in FIG. 2 and the fuel line is again ready for operation.

It is noted that the fuel filter and sediment bowl combination provides a condition in which impurities settle into the bowl and can be removed periodically. The filtering action of the filter 12 removes any other impurities before they pass onto the fuel pump. This eliminates any danger of low engine performance or excessive wear due to impurities.

I claim:

1. A fuel line purifier comprising, a fuel line of an internal combustion engine, a filter housing defining a fuel inlet passage in the upper portion of said housing connected to said fuel line, said housing defining a static fuel chamber in communication with a fuel inlet passage and extending to lower portion of said housing for creating a static fuel condition, a sediment bowl defining a sediment chamber, conduit means defining a drain passage connecting the bottom of said static fuel chamber and said sediment chamber for trapping foreign material, a filter element received in said housing for filtering fuel from said static fuel chamber, means including said housing and said filter element defining a filtered fuel chamber and an outlet passage connected to said fuel line, said purifier thereby trapping impurities which settle from fuel under a static condition and filtering fuel before passing through the outlet passage.

2. A fuel line purifier as set forth in claim 1 including a sediment bowl constructed of transparent material.

3. A fuel line purifier as set forth in claim 1 wherein said filter element lies adjacent to and provides filtering action in the upper portion of said static fuel chamber thereby creating in the lower portion of said static fuel chamber a more stagnant condition of fuel to allow sediment to be trapped in said sediment bowl.

4. A fuel line purifier as set forth in claim 1 wherein said means defining a drain passage connect the lowest point in said static fuel chamber with said sediment chamber.

5. A fuel line purifier as set forth in claim 1 wherein said housing defines a filter support above the bottom of said static chamber to thereby permit settlement of foreign material in the bottom of said static chamber adjoining said sediment chamber.

6. A fuel line purifier as set forth in claim 1 wherein said housing defines the outlet passage in communication with the top portion of said filtered fuel chamber.

7. A fuel line filter as set forth in claim 1 wherein said filter element consists of a cylindrical element positioned between said static fuel chamber and said filtered fuel chamber.

8. A fuel line purifier as set forth in claim 1 including means removably supporting said sediment bowl.

9. A fuel line purifier as set forth in claim 1 including means removably supporting said filter element.